United States Patent [19]
Winkler et al.

[11] Patent Number: 6,090,355
[45] Date of Patent: *Jul. 18, 2000

[54] METHOD AND DEVICE FOR CLEANING FLUE GASES FROM FURNACES

[75] Inventors: Hermann Winkler, Recklinghausen; Marion Neumann, Lünen, both of Germany

[73] Assignee: Steag Aktiengesellschaft, Germany

[*] Notice: This patent is subject to a terminal disclaimer.

[21] Appl. No.: 09/068,692
[22] PCT Filed: Nov. 8, 1996
[86] PCT No.: PCT/EP96/04899
    § 371 Date: Sep. 9, 1998
    § 102(e) Date: Sep. 9, 1998
[87] PCT Pub. No.: WO97/18029
    PCT Pub. Date: May 22, 1997

[30] Foreign Application Priority Data

Nov. 13, 1995 [DE] Germany .......................... 195 42 065

[51] Int. Cl.⁷ .................................................. B01D 47/00
[52] U.S. Cl. ................ 423/210; 423/240 R; 423/240 S; 423/243.08; 423/244.07; 423/245.1; 423/555; 422/168; 422/187; 422/234
[58] Field of Search ............................... 423/210, 240 R, 423/240 S, 242.1, 243.08, 244.07, 245.1, 555; 422/168, 187, 234

[56] References Cited

U.S. PATENT DOCUMENTS 5,306,475  4/1994  Fichtel et al. ........................... 423/210
5,352,647  10/1994  Suchenwirth ........................... 502/417
5,569,436  10/1996  Lerner ...................................... 422/170
5,618,508  4/1997  Suchenwirth et al. .................. 502/417
5,811,066  9/1998  Winkler et al. ......................... 423/210

FOREIGN PATENT DOCUMENTS 0367148     5/1990   European Pat. Off. .
0 405 290 A1 1/1991  European Pat. Off. .
0496432     7/1992   European Pat. Off. .
0509258 (A1) 10/1992 European Pat. Off. .
0628341 (A1) 12/1994 European Pat. Off. .
2 330 578   1/1974   Germany .
3941894 (A1) 6/1991  Germany .
4123258     1/1993   Germany .
4123258 (A1) 1/1993  Germany .
444d1090    5/1996   Germany .
50-33980    4/1975   Japan ...................................... 423/555
50-159897   12/1975  Japan ...................................... 423/555
56-108513   8/1981   Japan ...................................... 423/555
57-63117    4/1982   Japan ...................................... 423/555
d4-45827    2/1992   Japan .................................... 423/240 S
62-216630   9/1997   Japan ...................................... 423/210
2288754     11/1995  United Kingdom .
9308902     5/1993   WIPO .

Primary Examiner—Gary P. Straub
Assistant Examiner—Timothy C Vanoy
Attorney, Agent, or Firm—Robert W. Becker & Associates

[57] ABSTRACT

A method for scrubbing flue gases of furnaces includes subjecting the flue gases with addition of activated carbon particles to wet scrubbing in a wet scrubbing device. Activated carbon particles are mixed with particles of at least one compound selected from slaked lime and limestone to produce a particle mixture that is introduced into the flue gases upstream of a flue gas heat exchanger that is positioned upstream of the wet scrubbing device.

10 Claims, 1 Drawing Sheet

METHOD AND DEVICE FOR CLEANING FLUE GASES FROM FURNACES

BACKGROUND OF THE INVENTION

The invention relates to a method and a device for cleaning flue gases of furnaces, whereby the flue gases are subjected to a wet scrubbing process with addition of activated carbon.

Such a method is known from German patent application 41 23 258. Under the conditions of wet scrubbing, the activated carbon particles adsorb the heavy metals and also organic contaminates, such as dioxins and furanes, contained in the flue gases. The removal of heavy metals, especially also of mercury, and of the organic components thus is performed during the desulfurization step without additional cleaning steps being required. The expenditure with regard to the facility and operational measures is thus comparatively minimal.

Furthermore, a relatively small amount of activated carbon particles can be employed. However, this still requires a considerable expenditure because activated carbon is a relatively expensive material.

It is an object of the invention to reduce the expenditures by minimizing the required amount of activated carbon particles.

SUMMARY OF THE INVENTION

As a solution to this object the method according to the invention is characterized in that the activated carbon particles are mixed with particles of slaked lime and/or limestone and that the particle mixture is introduced into the flue gases upstream of the wet scrubbing step. Surprisingly, it was found that this relatively simple measure results in a reduction of the activated carbon consumption by more than 25%. The invention is based on the recognition that the acidic components of the flue gases such as $SO_2$, $SO_3$, HCl and HF during the wet scrubbing process have the tendency to be adsorbed at the activated carbon particles. This tendency is counteracted by the invention. $Ca(OH)_2$ or $CaCO_3$ reacts already in the gas phase with the acidic components of the flue gases so that the activated carbon particles during the wet scrubbing process are available fully for their actual function, that is, for the adsorption of primarily $Hg^0$ and $Hg^{2+}$ as well as dioxins and furanes. The additional material expenditure is comparatively minimal because slaked lime or limestone is a comparatively inexpensive material. Also, the additional facility expenditure is limited. Thus, a considerable cost advantage remains.

Inasmuch as the wet scrubbing step has upstream thereof a flue gas heat exchanger, the particle mixture is introduced advantageously upstream of the flue gas heat exchanger into the flue gases. In the flue gas heat exchanger the temperature falls below the dew point of sulfuric acid, so that $H_2SO_4$ will condense and can react to a greater extent with the particles of slaked lime or limestone. When a regenerative heat exchanger is used, the passage of contaminates to the clean gas side is prevented.

An especially favorable method results when the activated carbon particles are separated directly from the suspension resulting from the wet scrubbing process, preferably by flotation, whereby it is advantageous to subject the suspension before this step to a partial dewatering process.

Moreover, in a further development of the invention it is suggested, to recirculate at least a portion of the activated carbon particles into the wet scrubbing process. This method step is based on the recognition that the activated carbon particles, even though used in minimal amounts, are not yet spent after a single passage through the wet scrubbing process and still retain an activatable adsorption potential.

It is advantageous in this context to subject a portion of the recirculated activated carbon particles, before introduction into the wet scrubbing process, to a thermal desorption process. In this manner, it is possible to guide the activated carbon particles in circulation.

The thermal desorption of the activated carbon particles results in a drying of the material so that, advantageously, it is possible to recirculate the desorbed activated carbon particles to be mixed with the particles of slaked lime or limestone. The activated carbon circulation thus extends back to the method step of particle mixture formation.

The invention also provides a device for performing the above method with a flue gas desulfurization scrubber which has gas inlet and gas outlet lines whereby this device is characterized by a mixing device for activated carbon particles and particles of slaked lime and/or of limestone which is connected to the gas inlet line of the flue gas desulfurization scrubber. The particle mixture generated in the mixing device is thus injected upstream of the flue gas desulfurization scrubber into the flue gases.

When a flue gas heat exchanger is connected upstream of the flue gas desulfurization scrubber, in a further development of the invention it is suggested to arrange the mixing device upstream of the flue gas heat exchanger so that condensed sulfuric acid can react in the heat exchanger to a greater extent with the slaked lime or limestone.

Advantageously, a device for separating solid materials from the suspension resulting from the wet scrubbing process is arranged downstream of the flue gas desulfurization scrubber, and a flotation device with a gypsum outlet and an outlet for activated carbon particles is connected downstream thereof. The outlet for activated carbon particles is connected to an adsorption medium line guided to the flue gas desulfurization scrubber and to a thermal desorption device.

It may be advantageous in this context to connect the outlet of the thermal desorption device to the adsorption medium line of the flue gas desulfurization scrubber and/or to the mixing device.

BRIEF DESCRIPTION OF THE DRAWINGS

The invention is described in the following with the aid of preferred embodiments reference to the attached drawing. The drawing shows in.

DESCRIPTION OF PREFERRED EMBODIMENTS

Figure 1:
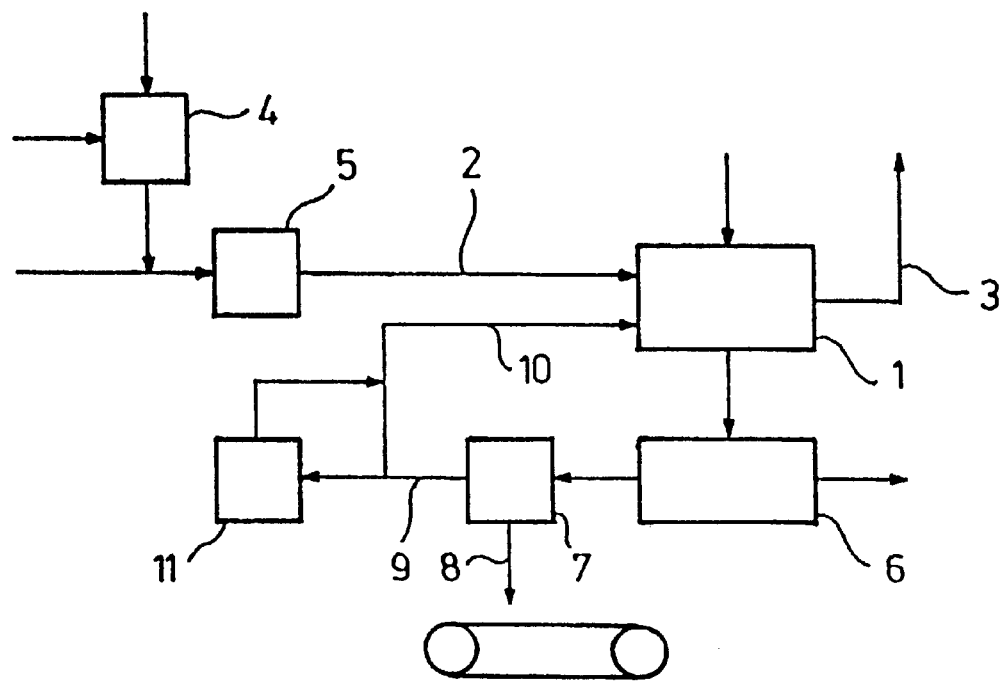
FIG. 1 a flow diagram of a first embodiment.

The device according to FIG. 1 comprises a flue gas desulfurization scrubber 1 which is connected to a gas inlet line 2 and a gas outlet line 3. A mixing device 4 is connected to the gas inlet line 2 in which a particle mixture of activated carbon and slaked lime and/or limestone is produced. The particle mixture is injected upstream of the flue gas desulfurization scrubber I into the flue gases. This results in a reaction of the slaked lime or of the limestone with the acidic components of the flue gases so that they can no longer react with the activated carbon particles in the flue gas desulfurization scrubber 1. Accordingly, the activated carbon particles are thus available for adsorption of heavy metals and organic contaminants.

The mixing device 4 is arranged upstream of a flue gas heat exchanger 5. In the flue gas heat exchanger 5 a condensation of sulfuric acid and an increased reaction of liquid sulfuric acid with the slaked lime or the limestone takes place.

A hydro cyclone 6 is arranged downstream of the flue gas desulfurization scrubber 1. The partially dewatered suspension is guided from here to a flotation device 7 which comprises a gypsum outlet 8 and an activated carbon outlet 9. The latter is connected by an adsorption medium line 10 to the flue gas desulfurization scrubber 1 and is also connected to a thermal desorption device 11. The outlet of the latter is connected to line 10. The absorption medium is thus circulated with partial desorption.

Figure 2:
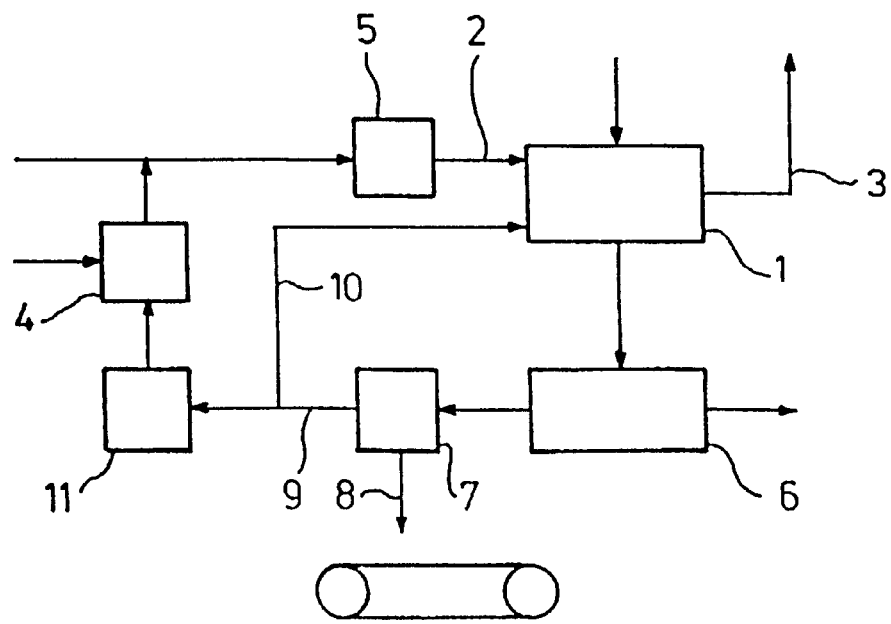
FIG. 2 a flow diagram of a second embodiment.

The device according to FIG. 2 differs from that of FIG. 1 only in that the thermal desorption device 11 is connected to the mixing device 4. The generation of the particle mixture is thus incorporated into the recirculation of the adsorption medium.

In the context of the invention further developments are of course possible. Primarily, a recirculation of the adsorption medium can be eliminated, even though this method step is especially advantageous. Furthermore, it is possible to positively affect the method by introducing milk of lime (as shown in the drawing) into the flue gas desulfurization scrubber so that the wet scrubbing process is adjusted to a pH of approximately 6.

The present invention is, of course, in no way restricted to the specific disclosure of the specification and drawings, but also encompasses any modifications within the scope of the appended claims.

We claim:

1. A method for scrubbing flue gases of furnaces by subjecting the flue gases with addition of activated carbon particles for removal of heavy metals and organic compounds to wet scrubbing in a wet scrubbing device, said method comprising the steps of:

mixing activated carbon particles with particles of at least one compound selected from the group consisting of slaked lime and limestone to produce a particle mixture;

introducing the particle mixture into the flue gases upstream of a flue gas heat exchanger that is positioned upstream of the wet scrubbing device; and guiding the flue gases and the particle mixture through the heat exchanger and into the wet scrubbing device.

2. A method according to claim 1, further including the step of separating by flotation the active carbon particles from a suspension resulting from the wet scrubbing process.

3. A method according to claim 2, further including the step of partially dewatering the suspension resulting from the wet scrubbing process before said step of separating.

4. A method according to claim 2, further including the step of recirculating at least a portion of the activated carbon particles into the wet scrubbing process after said step of separating.

5. A method according to claim 4, wherein said step of recirculating includes the step of thermally desorbing a portion of the activated carbon particles.

6. A method according to claim 5, wherein, after said step of desorbing, the desorbed activated carbon particles are recirculated for mixing with the particles of slaked lime and/or lime stone.

7. A device for scrubbing flue gases of furnaces with addition of activated carbon particles for removal of heavy metals and organic compounds, said device comprising:

a flue gas desulfurization scrubber having a gas inlet line and a gas outlet line;

a flue gas heat exchanger in said gas inlet line of said flue gas desulfurization scrubber;

a mixing device for activated carbon particles and particles of slaked lime, limestone or a mixture of slaked lime and limestone, said mixing device connected to said gas inlet line at a location upstream of said flue gas heat exchanger so that the activated carbon particles and particles of slaked lime, limestone or a mixture of slaked lime and limestone and the gas pass through said flue gas heat exchanger into said flue gas desulfurization scrubber.

8. A device according to claim 1, further comprising:

a device for separating solid materials from a suspension resulting from a wet scrubbing process in said flue gas desulfurization scrubber, wherein said device for separating solid materials is arranged downstream of said flue gas desulfurization scrubber;

a flotation device with a gypsum outlet and an outlet for activated carbon particles connected to said device for separating;

an adsorption medium line connected to said flue gas desulfurization scrubber;

a thermal desorption device;

wherein said outlet for activated carbon particles is connected to said adsorption medium line and to said thermal desorption device.

9. A device according to claim 8, wherein said thermal desorption device has an outlet connected to said adsorption medium line of said flue gas desulfurization scrubber.

10. A device according to claim 8, wherein said thermal desorption device has an outlet connected to said mixing device.

* * * * *